US011795828B2

(12) United States Patent
Simon et al.

(10) Patent No.: US 11,795,828 B2
(45) Date of Patent: Oct. 24, 2023

(54) BLADE FOR A TURBINE ENGINE, ASSOCIATED TURBINE ENGINE DISTRIBUTOR AND TURBINE ENGINE

(71) Applicant: SAFRAN AIRCRAFT ENGINES, Paris (FR)

(72) Inventors: Matthieu Simon, Moissy-Cramayel (FR); Jean-Luc Bacha, Moissy-Cramayel (FR); Paul Danre, Moissy-Cramayel (FR); Léandre Ostino, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 42 days.

(21) Appl. No.: 17/594,071

(22) PCT Filed: Mar. 16, 2020

(86) PCT No.: PCT/FR2020/050559
§ 371 (c)(1),
(2) Date: Oct. 1, 2021

(87) PCT Pub. No.: WO2020/201653
PCT Pub. Date: Oct. 8, 2020

(65) Prior Publication Data
US 2022/0170377 A1    Jun. 2, 2022

(30) Foreign Application Priority Data

Apr. 3, 2019 (FR) ....................................... 1903586

(51) Int. Cl.
*F01D 5/18* (2006.01)
*F01D 9/06* (2006.01)

(52) U.S. Cl.
CPC .............. *F01D 5/189* (2013.01); *F01D 9/065* (2013.01); *F05D 2230/237* (2013.01); *F05D 2240/30* (2013.01); *F05D 2260/201* (2013.01)

(58) Field of Classification Search
CPC .......... F01D 5/189; F01D 5/188; F01D 9/065; F01D 9/041; F05D 2240/10–15; F05D 2260/201
See application file for complete search history.

(56) References Cited

U.S. PATENT DOCUMENTS

| 4,798,515 A | 1/1989 | Hsia et al. |
| 6,382,908 B1 * | 5/2002 | Keith .................... F01D 5/189 |
| | | 415/115 |

(Continued)

FOREIGN PATENT DOCUMENTS

| CN | 105849420 A | 8/2016 |
| CN | 108026776 A | 5/2018 |

(Continued)

OTHER PUBLICATIONS

International Search Report issued in International Application PCT/FR2020/050559 dated Jun. 26, 2020 (2 pages).

(Continued)

*Primary Examiner* — David E Sosnowski
*Assistant Examiner* — Arthur Paul Golik
(74) *Attorney, Agent, or Firm* — Bookoff McAndrews, PLLC

(57) ABSTRACT

A blade for a turbomachine intended to be disposed about an axis while extending radially between a radially outer end and a radially inner end, the blade having at least one cooling cavity opening out to the radially outer end of the blade and to the radially inner end of the blade, the blade having at least a first tubular liner and at least a second tubular liner each engaged in the cavity, the radially outer end of the first (Continued)

liner opening out to the radially outer end of the blade, and the radially inner end of the second liner opening out to the radially inner end of the blade.

13 Claims, 5 Drawing Sheets

(56) References Cited

U.S. PATENT DOCUMENTS

| | | | |
|---|---|---|---|
| 2013/0195641 A1 | 8/2013 | Povey | |
| 2013/0315725 A1 | 11/2013 | Uechi et al. | |
| 2016/0069200 A1 | 3/2016 | Ols et al. | |
| 2016/0312630 A1* | 10/2016 | Davis, III | F01D 9/065 |
| 2018/0328187 A1* | 11/2018 | Oke | F01D 9/065 |
| 2020/0149401 A1* | 5/2020 | Propheter-Hinckley | F01D 5/18 |
| 2020/0308968 A1* | 10/2020 | Eryilki | F01D 5/16 |

FOREIGN PATENT DOCUMENTS

| | | | | |
|---|---|---|---|---|
| EP | 1626162 A1 | * | 2/2006 | ............ F01D 5/189 |
| EP | 1626162 A1 | | 2/2006 | |
| EP | 1674660 A2 | | 6/2006 | |
| EP | 2471612 A1 | | 7/2012 | |
| EP | 2921649 A1 | | 9/2015 | |
| EP | 3184750 A1 | * | 6/2017 | ............ F01D 25/12 |
| EP | 3184750 A1 | | 6/2017 | |
| EP | 3279434 A1 | * | 2/2018 | .......... F01D 25/005 |
| FR | 2955145 A1 | | 7/2011 | |
| GB | 2386926 A | * | 10/2003 | ............ F01D 5/189 |
| GB | 2386926 A | | 10/2003 | |

OTHER PUBLICATIONS

Search Report issued in French Application FR1903586 dated Nov. 18, 2019 (2 pages).
First Office Action issued in corresponding Chinese Application No. 2020800280699, dated Apr. 22, 2023.

* cited by examiner

[Fig. 1]
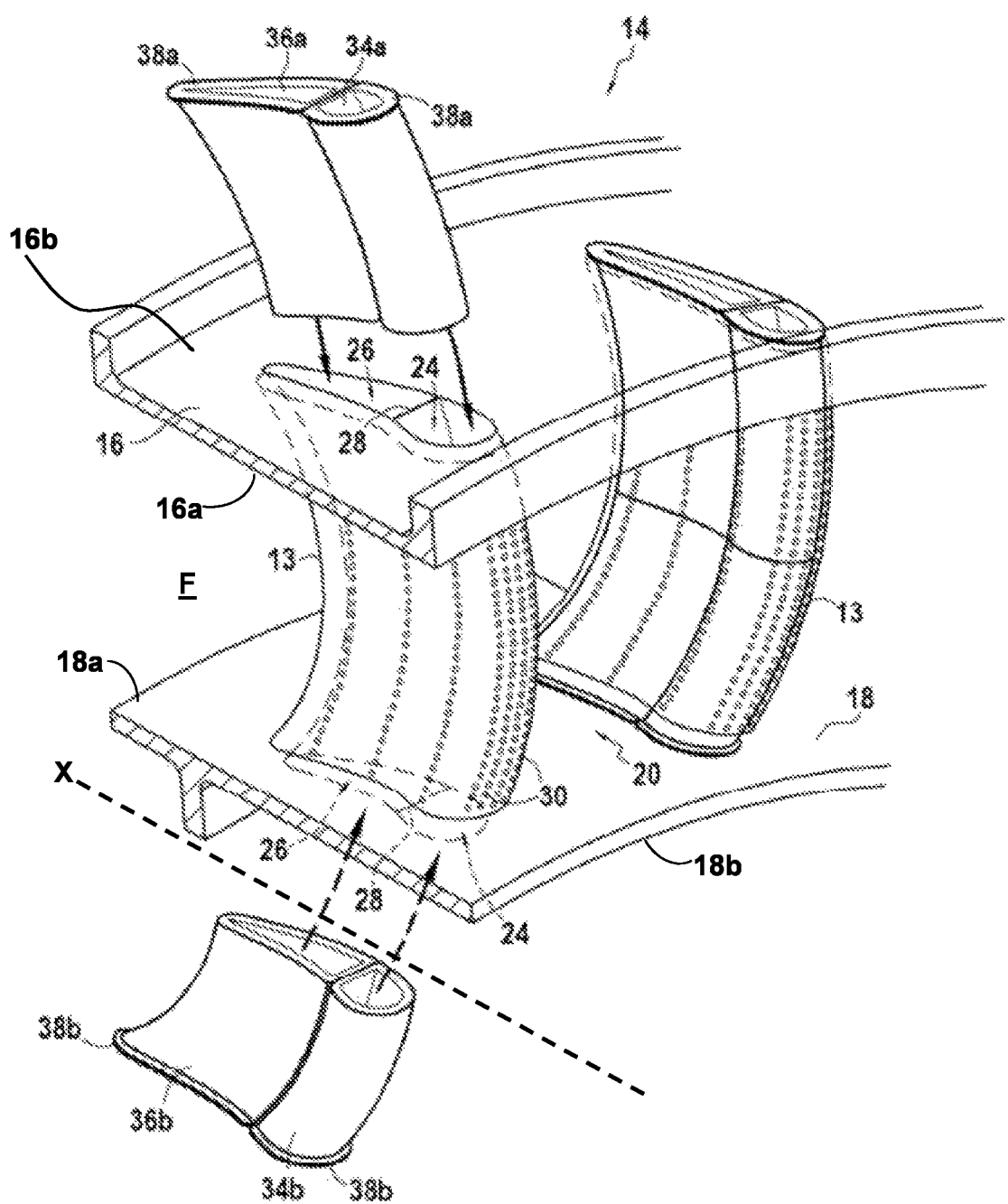

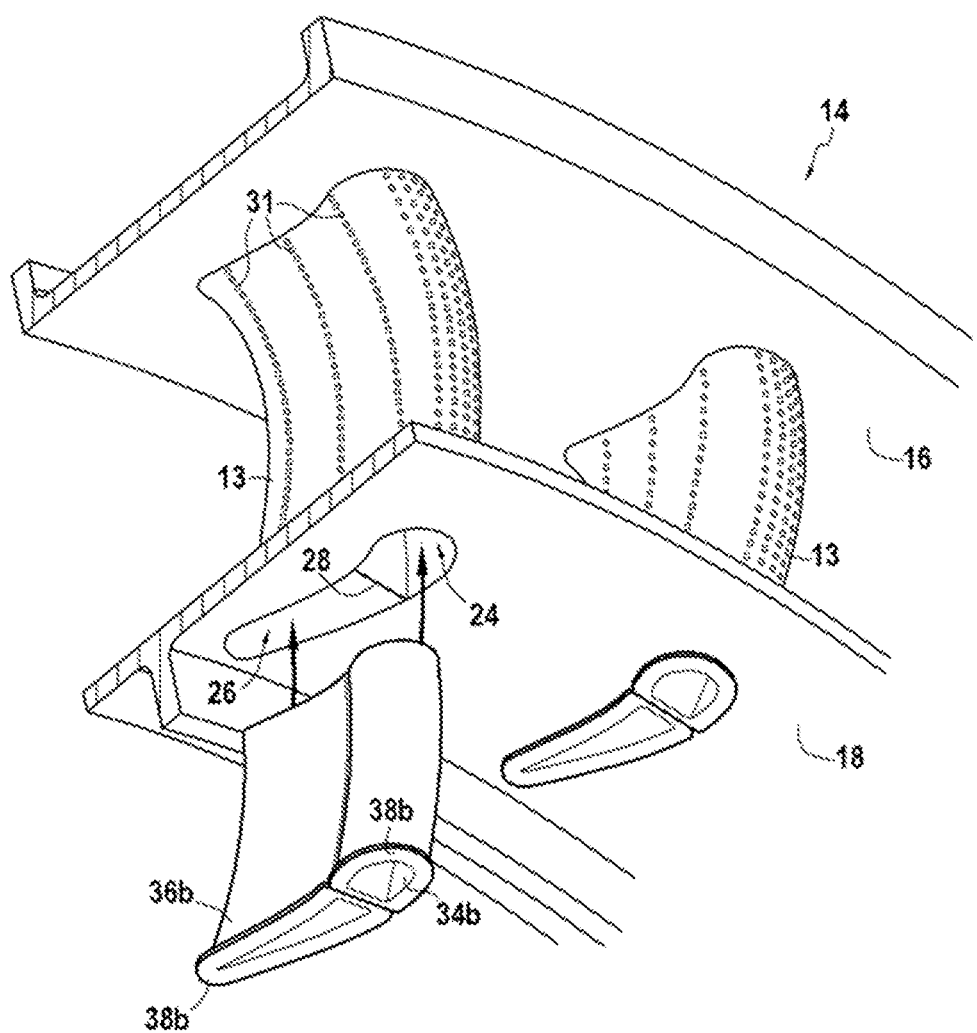
[Fig. 2]

[Fig. 3]
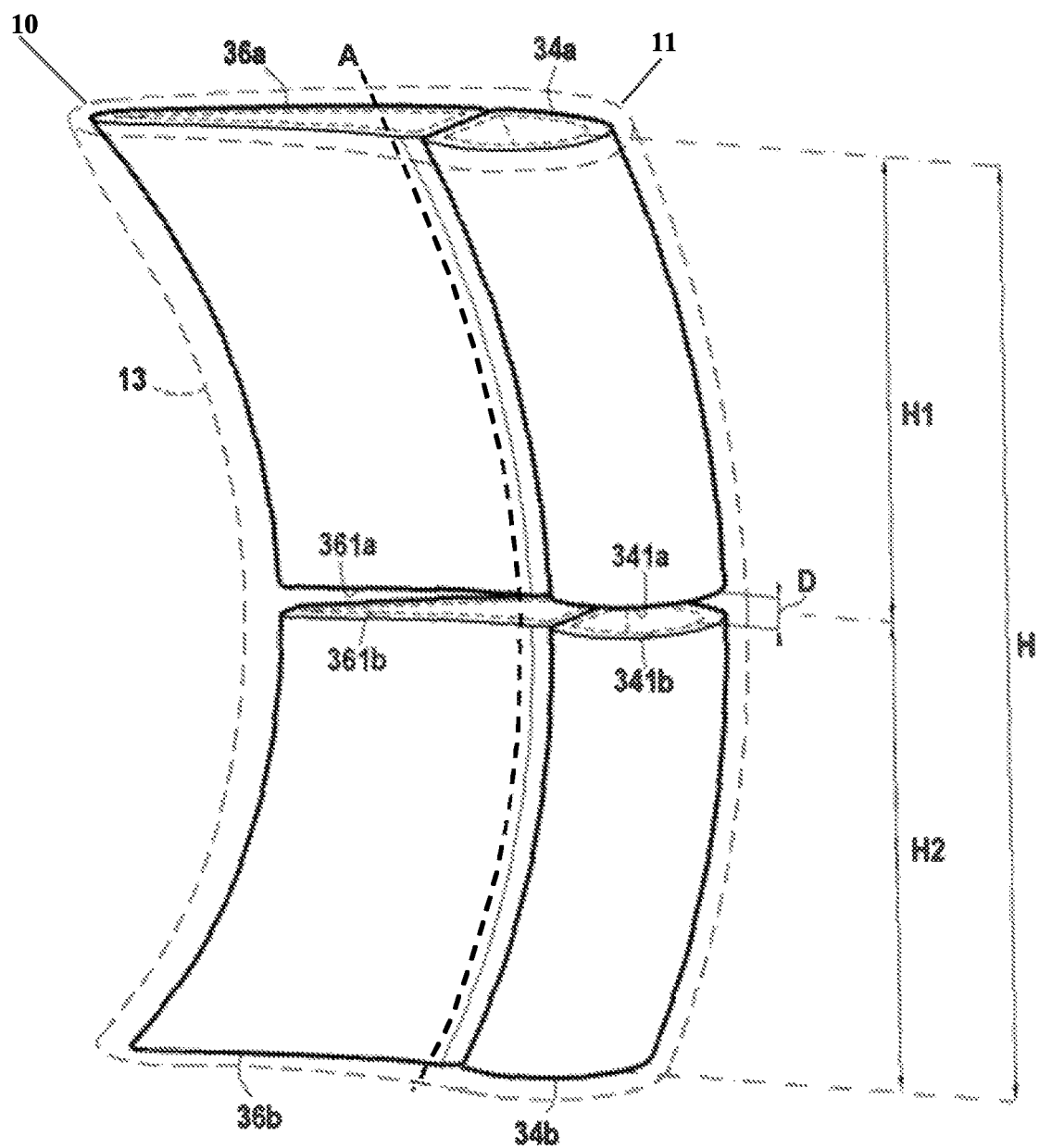

[Fig. 4]
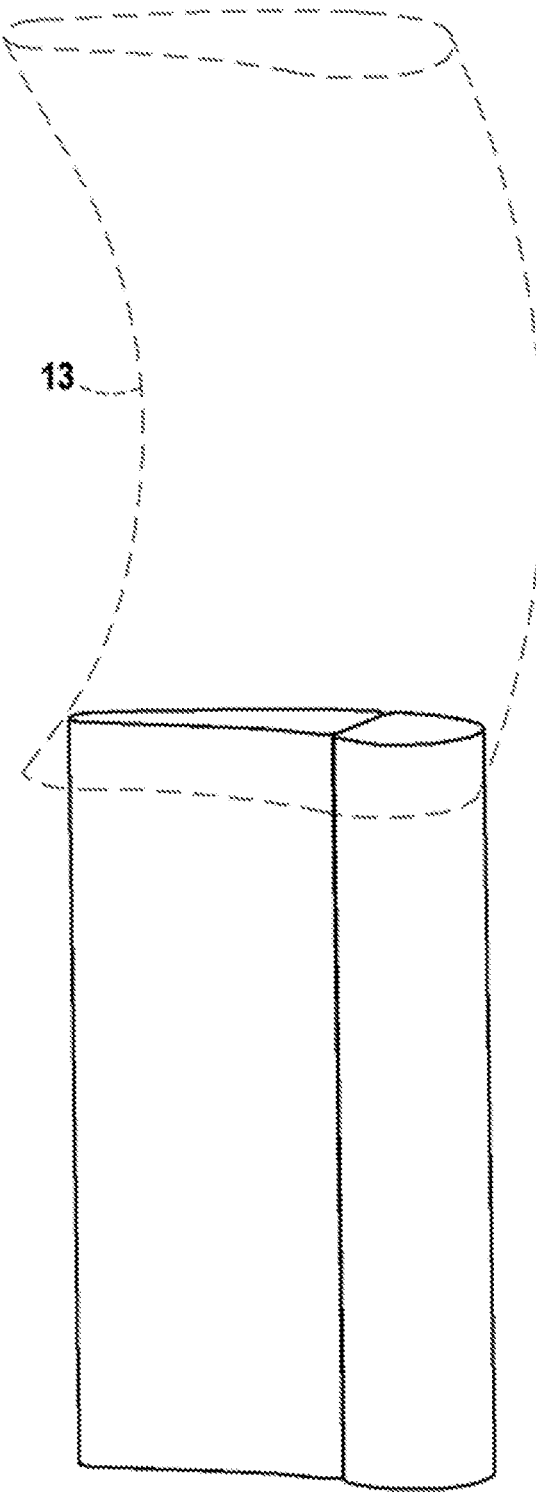

[Fig. 5]
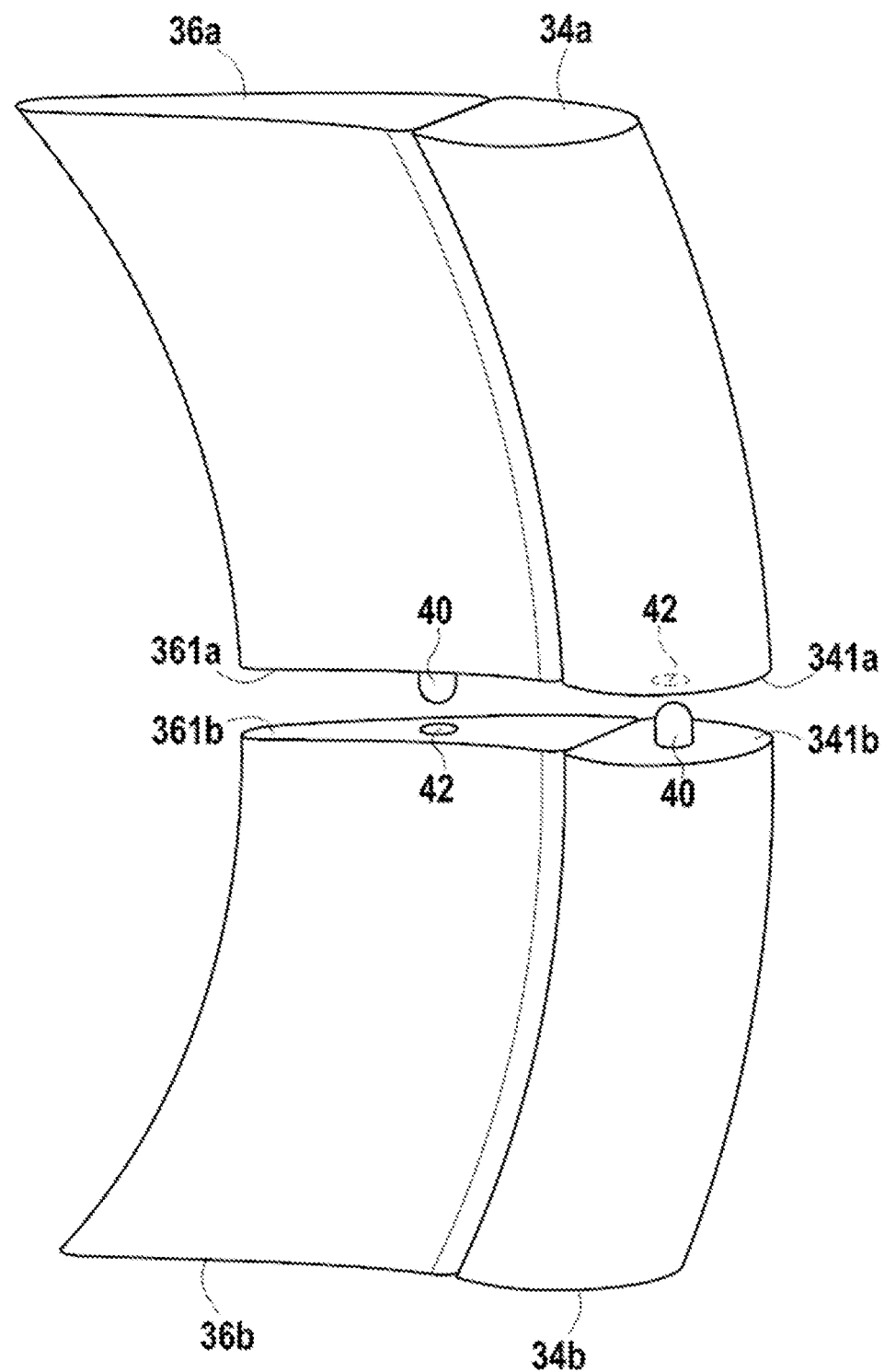

BLADE FOR A TURBINE ENGINE, ASSOCIATED TURBINE ENGINE DISTRIBUTOR AND TURBINE ENGINE

CROSS-REFERENCE TO RELATED APPLICATIONS

This patent application is the U.S. National Stage entry under 35 U.S.C. § 371 of International Patent Application No. PCT/FR2020/050559, filed on Mar. 16, 2020, which claims the benefit of priority to French Patent Application No. 1903586, filed on Apr. 3, 2019.

TECHNICAL FIELD

The present invention relates to the field of aeronautical turbomachines, and more specifically a blade of a turbine nozzle for a turbomachine, and a turbomachine including such a nozzle.

PRIOR ART

The high-pressure or low-pressure turbomachine nozzles, as described in document FR 2 955 145, include in particular stator vanes held at each of their ends by an inner platform and an outer platform, these defining a flowpath for the circulation of gases ejected from the combustion chamber. These blades allow directing the flow of the gases exiting the combustion chamber on the rotor blades of the turbine. These blades are hollow and include at least one cavity or two cavities, in particular a leading edge cavity and a trailing edge cavity, one end of which opens out to the outside of the flowpath.

These blades being exposed to the hot combustion gases, it is necessary to cool them in order to reduce the thermal stresses. One solution consists in using air coming from another element of the turbomachine, for example the compressor. More specifically, relatively fresh air is taken upstream of the combustion chamber at the outlet of a compressor stage. This air is injected into the cavity/cavities of the blades through either ends thereof, to cool them from inside. Air then escapes in the flowpath through holes made in the blades and communicating with the cavity/cavities of the blade and with the flowpath, the cooling air creating a fresher air protective film flowing along the external surface of the blade.

In addition, generally, a liner is embedded in the cavity/cavities of such a blade. This liner includes a plurality of holes over its entire surface extending between the platforms. The liner includes a closed bottom wall at one end and opens out to the outside of the flowpath, on the same side as the cavity that contains it. The relatively fresh air taken upstream of the combustion chamber is injected into the liners through the platforms. Fresh air enters inside the liner to cool the blade, from inside, by impact. However, the integration of such a liner in an airfoil requires having a slightly cambered blade airfoil, in order to make the insertion of the liner into the cavity possible. This stress limits the possibility of considering variations in the airfoils, in particular the increase in the camber of the blade.

There is therefore a need for a device that allows solving the technical problem above.

DISCLOSURE OF THE INVENTION

The present disclosure relates to a blade for a turbomachine configured to be disposed about an axis and to extend radially between a radially outer end and a radially inner end, the blade comprising at least one cooling cavity opening out to the radially outer end of the blade and to the radially inner end of the blade, the blade comprising at least a first tubular liner and at least a second tubular liner each engaged in the cavity, the radially outer end of the first liner opening out to the radially outer end of the blade, and the radially inner end of the second liner opening out to the radially inner end of the blade.

The ends of the blade and of the liners are for example the inner and outer radial ends when the blade is mounted in a turbomachine. The blade is preferably hollow, the cavity/cavities extending on either side of the blade, at each end thereof. In other words, a cavity of the blade is equivalent to an orifice passing through the entire height of the blade, and opening out at the radially inner and outer ends. The ends can for example be flanges disposed around the blade at each end thereof, to which the ends of the liners are fixed.

According to the present disclosure, the first liner is thus inserted into the cooling cavity from the radially outer end, and the second liner is thus inserted into the cooling cavity from the radially inner end. In other words, when mounting the liners, the liners are inserted into the cavity along two different mounting directions. This allows having two short liners, instead of one long liner extending over the entire length of the cavity. It is thus possible to envisage a significant curvature of the airfoil, while maintaining effective cooling of the blade, over the entire height thereof. This allows having more latitude to improve the airfoil of the blades of a turbine nozzle for example, and thus to improve the turbine efficiency.

In some embodiments, the radially outer end of the first liner is a first end fixed on the radially outer end of the blade, and the radially inner end of the second liner is a first end fixed on the radially inner end of the blade, the first liner and the second liner each further comprising a second free end, the second free ends of the first and second liners facing each other in the cavity for cooling the blade.

By "facing each other", it is understood that the second free ends are opposite each other, either by being in contact with each other, or by being spaced from each other. In this second case, the second free ends are separated from each other such that no partition exists therebetween. Thus, the second free ends of the liners do not overlap, making the mounting of each liner at one end of the blade easier.

In some embodiments, the first end of each liner comprises an end flange bearing on the ends of the blade.

In some embodiments, the flange is welded or brazed to the ends of the blade.

This configuration allows optimizing the mounting of the liners and their holding on the blade.

In some embodiments, along a direction radial to the axis, a height of the first liner is different from a height of the second liner between the first end and the second end of said liners, the height of each liner being less than 70%, preferably less than 60%, more preferably less than 50% of the length of the cavity in which said liners are engaged.

The height of the liners denotes the length along their main axis, that is to say the radial direction when the blade is mounted in a turbomachine. These height values of the liners relative to the total height of the blade allow obtaining greater cambers over at least one portion of the blade. The blade may for example have a greater camber in the vicinity of the first end than in the vicinity of the second end thereof.

In some embodiments, the height of the first liner is different from the height of the second liner.

This allows adapting the height of each liner according to the desired airfoil of the blade.

In some embodiments, a central axis of said blade has a radius of curvature between 30 mm and 500 mm, preferably between 30 mm and 100 mm. The liners according to the prior art do not allow designing blades whose radius of curvature would be less than 90 mm. Particularly, the turbine blades usually have radii of curvature between 90 mm and 500 mm. The liners according to the present disclosure allow manufacturing blades having a smaller radius of curvature.

In some embodiments, a central axis of said blade has a variable radius of curvature between the ends of the blade.

The central axis of the blade and of the liners denotes the main axis along which the blade and the liners extend. These radii of curvature are smaller than the radii of curvature existing on the blades comprising a single liner extending over the entire height of the blade, and allow improving the efficiency of the turbines on which the blades are mounted.

In some embodiments, the second end of each liner comprises a bottom wall, a distance between the bottom walls of each of the liners being less than 10 mm.

These values allow minimizing the portions of the cavity that don not comprise any liner, that is to say the space between the second ends of the first and of the second liner, and thus improving the cooling of the blade.

In some embodiments, the second end of one of the first and of the second liner comprises a protrusion protruding from said second end, the second end of the other of the first and second liner comprising an orifice, the protrusion being inserted into the orifice.

The protrusion can for example be inserted into the orifice by pressure. This link mode allows securing the first and second liners together, and thus limiting the risk of movement of the liners relative to each other.

In some embodiments, the blade comprises a leading edge cavity and a trailing edge cavity separated from the leading edge cavity by a wall, each of these cavities opening out on the radially inner and outer ends of the blade, a first liner being engaged in each of the leading edge and trailing edge cavity, and a second liner being engaged in each of the leading edge and trailing edge cavity.

In other words, the blade comprises four liners. Two first liners are inserted from the radially outer end, into the trailing edge cavity and the leading edge cavity, and two second liners are inserted from the radially inner end, into the trailing edge cavity and the leading edge cavity. The radii of curvature of the leading edge and trailing edge cavities may be different from each other.

In some embodiments, the radially inner and outer ends of the blade are coaxial nozzle platforms configured to extend about an axis, the blade extending between the platforms each having a flowpath face configured to delimit a gas circulation flowpath and a face opposite to the flowpath face, the at least one cavity of the blade opening out on the face opposite to the flowpath face of the two platforms, one end of the first liner opening out on the face opposite to the flowpath face of the first platform, and one end of a second liner opening out on the face opposite to the flowpath face of the second platform.

The present disclosure also relates to a nozzle for a turbomachine configured to be disposed about an axis and to extend radially between a radially inner platform and a radially outer platform, each platform comprising a flowpath face configured to delimit a fluid flow channel and an end face opposite to the flowpath face, the nozzle comprising at least one blade according to any one of the preceding embodiments, the at least one cavity for cooling the blade opening out on the end face of the radially inner platform and on the end face of the radially outer platform, the radially outer end of the first liner opening out on the end face of the radially outer platform, and the radially inner end of the second liner opening out on the end face of the radially inner platform.

The blades of the present disclosure are stator vanes extending radially between the platforms of the nozzle.

The present disclosure also relates to a turbomachine turbine comprising the nozzle according to the present disclosure.

The turbine can be a low-pressure turbine or a high-pressure turbine.

The present disclosure also relates to a turbomachine comprising the turbine according to the present disclosure.

BRIEF DESCRIPTION OF THE DRAWINGS

The invention and its advantages will be better understood upon reading the detailed description given below of different embodiments of the invention given by way of non-limiting examples. This description refers to the pages of appended figures, on which:

FIG. 1 represents an external perspective view of a turbine nozzle for a turbomachine according to the present disclosure;

FIG. 2 represents an internal perspective view of the turbine nozzle of FIG. 1;

FIG. 3 represents a perspective view of liners of the present disclosure inserted into a hollow blade;

FIG. 4 represents a perspective view of liners according to the prior art inserted into a hollow blade;

FIG. 5 represents a perspective view of a modified example of the liners of FIG. 3.

DESCRIPTION OF THE EMBODIMENTS

FIG. 1 represents a sector 14 of a turbine nozzle for a high-pressure turbomachine, the nozzle can be sectorized and including a vane ring, or hollow stator vanes 13, arranged between two coaxial platforms: an outer platform 16 and an inner platform 18. The platforms 16, 18 can form an annular block, or comprise a plurality of ring sectors placed circumferentially end to end. They delimit a gas circulation flowpath 20 in which the blades 13 evenly distributed angularly between the platforms 16, 18 are located, forming a fluid flow channel F. Two blades 13 are represented. Each blade 13 includes a trailing edge cavity 26 opening out to the outside of the flowpath 20 through the platform 16 and the platform 18, and at least one leading edge cavity 24 opening out to the outside of the flowpath 20 through the platform 16 and the platform 18, the cavities 24 and 26 being separated from each other by a wall 28. These cavities communicate with the flowpath 20 by rows of holes 30, 31 extending axially (x-axis) and/or radially (central axis A) between a flow path face 18a of the inner platform 18 and a flow path face 16a of the outer platform 16 along the blades 13 to open out into the flowpath 20. A gas circulating from the outside of the flowpath 20 can thus enter the cavities 24, 26, flow into the blade 13, then be discharged into the flowpath 20 via the holes 30, 31, thus allowing the cooling of the blade 13.

A first tubular liner 36a is inserted into the trailing edge cavity 26, and a first tubular liner 34a is inserted into the leading edge cavity 24, from the outer end face 16b of the outer platform 16. By "outer", it is meant the face of the platform 16 opposite to the flowpath 20.

In addition, a second tubular liner 36b is inserted into the trailing edge cavity 26, and a second tubular liner 34b is inserted into the leading edge cavity 24, from the outer end face 18b of the inner platform 18. By "outer", it is meant the face of the platform 18 opposite to the flowpath 20.

Each of the tubular liners 34a, 34b, 36a, 36b is hollow, can be made of metal, for example a nickel or cobalt-based alloy, or of a composite material, and pierced with a plurality of holes (not represented in the figures). The first liners 34a, 36a each further include a flange 38a bearing on the outer face of the outer platform 16, and are fixed thereto, for example by welding or by brazing. The second liners 34b, 36b each include a flange 38b bearing on the outer face of the inner platform 18, and are fixed thereto, for example by welding or by brazing.

The first liners 34a, 36a of the leading edge 24 and trailing edge 26 cavity open out to the outside of the flowpath 20 through a platform, here the outer platform 16, while the second liners 34b, 36b of the leading edge 24 and trailing edge 26 cavity open out to the outside of the flowpath 20 through the other platform, here the inner platform 18. Relatively fresh air taken from the compressor is conducted on either side of the nozzle, that is to say both outside the outer platform 16 and outside the inner platform 18. The cooling air can therefore enter the liners 34a, 36a, 34b, 36b to cool the internal walls of the blades by impact effect and then flow into the flowpath through the holes of said blades 13 to create a cooling film around each of them.

FIG. 3 represents the arrangement of the liners 34a, 34b, 36a, 36b when they are inserted into the cavities 24, 26 of the blade 13, the latter being represented in dotted lines, in order to make the liners visible by transparency. It will be noted in this figure that the flanges 38a, 38b are not represented, to simplify the description.

The cavities 24, 26 within the blade 13 have a depth H, corresponding substantially to the height of the blade 13 along the radial direction of the nozzle. The first liners 34a, 36a have a height H1, and the second liners 34b, 36b have a height H2, along this radial direction (central axis A). According to the present embodiment, the heights H1 and H2 are substantially equal. However, this example is not limiting, and the heights H1 and H2 may be different, as long as H1 and H2 remain less than 70% of the value of H, preferably less than 60%, more preferably less than 50%.

The first trailing edge liner 36a comprises a bottom wall 361a closing the liner 36a at one end opposite to the end opening out to the outside of the outer platform 16. Likewise, the second trailing edge liner 36b comprises a bottom wall 361b closing the liner 36b at one end opposite to the end opening out to the outside of the inner platform 18. The bottom walls 361a and 361b face each other inside the cavity 26, either in contact with each other or alternately, spaced from each other by a distance D of less than 10 mm.

Similarly, the first leading edge liner 34a comprises a bottom wall 341a closing the liner 34a at one end opposite to the end opening out to the outside of the outer platform 16. Likewise, the second leading edge liner 34b comprises a bottom wall 341b closing the liner 34b at one end opposite to the end opening out to the outside of the inner platform 18. The bottom walls 341a and 341b face each other inside the cavity 24, either in contact with each other or alternately, spaced from each other by the distance D.

According to this embodiment, the first liners 34a and 36a are inserted from the outside of the outer platform 16, and the second liners 34b and 36b are inserted from the outside of the inner platform 18. Thus, the curvature of the blade 13 may be larger than in a configuration in which a single liner was used for each cavity 24, 26, over the entire height H. FIG. 4 illustrates such a case according to the prior art, in which the blade 13 has a camber similar to the camber of the blade 13 in FIG. 3, and illustrates the difficulty of inserting liners in this case. In FIG. 3, the central axis A is a mean camber line of the leading edge 11 and the trailing edge 10 of blade 13.

FIG. 5 represents a modified example of the embodiment of FIG. 3, in which the liners 36a and 34b each comprise a stud 40, which may be of hemispherical shape with a radius of less than 10 mm, and protruding in the radial direction from the bottom wall 361a and 341b respectively. These studs 40 are configured to ensure a clearance between the bottom walls 341a and 341b. The radius of the studs 40 may preferably be less than 0.1 mm or less than the distance D between the bottom walls 341a and 341b, in order to limit the mechanical stresses between the two liners. Alternatively, the studs 40 can also be inserted into an orifice 42 made in the facing bottom wall, namely the walls 361b and 341a respectively. This arrangement allows positioning the liners relative to each other, and limiting the movements relative to each other. It will be noted that the position of the studs 40 and of the orifices 42 is not limiting, the studs 40 being able to be provided for example on the walls 361b and 341a, or 361a and 341a, and the orifices on the walls 361a and 341b, or 361b and 341b, or other possible combinations.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Consequently, the description and the drawings should be taken in an illustrative rather than a restrictive sense.

The invention claimed is:

1. A blade for a turbomachine configured to be disposed about an axis and to extend radially between a radially outer end and a radially inner end, the blade comprising at least one cooling cavity opening out to the radially outer end of the blade and to the radially inner end of the blade, the blade comprising at least a first tubular liner and at least a second tubular liner each engaged in the cavity, the radially outer end of the first liner opening out to the radially outer end of the blade, and the radially inner end of the second liner opening out to the radially inner end of the blade, the blade having a camber such that a central axis of said blade has a radius of curvature between 30 mm and 100 mm, wherein the central axis is a mean camber line of a leading edge and a trailing edge.

2. The blade according to claim 1, wherein the radially outer end of the first liner is a first end fixed on the radially outer end of the blade, and the radially inner end of the second liner is a first end fixed on the radially inner end of the blade, the first liner and the second liner each further comprising a second free end, the second free ends of the first and second liners facing each other in the cavity for cooling the blade.

3. The blade according to claim 2, wherein the first end of each liner comprises an end flange bearing on a respective end of the blade, each flange being welded or brazed to said respective end.

4. The blade according to claim 2, wherein, along a direction radial to the axis, a height of the first liner is different from a height of the second liner between the first end and the second end of said liners, the height of each liner being less than 70%, of the height of the cavity in which said liners are engaged.

5. The blade according to claim 2, wherein the second end of each liner comprises a bottom wall, a distance between the bottom walls of each of the liners being less than 10 mm.

6. The blade according to claim 2, wherein the second end of one of the first and the second liner comprises a protrusion protruding from said second end, the second end of the other of the first and second liner comprising an orifice, the protrusion being configured to be inserted into the orifice.

7. The blade according to claim 1, wherein the blade comprises a leading edge cavity and a trailing edge cavity separated from the leading edge cavity by a wall, each of these cavities opening out on the radially inner and outer ends of the blade, a first leading edge liner and a first trailing edge liner being engaged respectively in the leading edge and the trailing edge cavity, and a second leading edge liner and a second trailing edge liner being engaged respectively in the leading edge and the trailing edge cavity.

8. A nozzle for a turbomachine, the nozzle being configured to be disposed about an axis and to extend radially between a radially inner platform and a radially outer platform, each platform comprising a flowpath face configured to delimit a fluid flow channel and an end face opposite to the flowpath face, the nozzle comprising at least one blade according to claim 1, the at least one cavity for cooling the blade opening out on the end face of the radially inner platform and on the end face of the radially outer platform, the radially outer end of the first liner opening out on the end face of the radially outer platform, and the radially inner end of the second liner opening out on the end face of the radially inner platform.

9. A turbomachine comprising the nozzle according to claim 8.

10. The blade according to claim 2, wherein, along a direction radial to the axis, a height of the first liner is different from a height of the second liner, the height of each liner being less than 60% of the height of the cavity in which said liners are engaged.

11. The blade according to claim 2, wherein, along a direction radial to the axis, a height of the first liner is different from a height of the second liner, the height of each liner being less than 50% of the height of the cavity in which said liners are engaged.

12. The blade according to claim 1, wherein the blade comprises a leading edge which is convex with respect to a straight radial direction of the blade, and a trailing edge which is concave with respect to said radial direction.

13. The blade according to claim 7, wherein the wall extends along a whole height of the blade.

* * * * *